US007961116B2

(12) United States Patent
Reusser et al.

(10) Patent No.: US 7,961,116 B2
(45) Date of Patent: Jun. 14, 2011

(54) APPARATUS AND METHOD OF DISPLAYING AN AIRCRAFT'S POSITION

(75) Inventors: Trent Reusser, New Brighton, MN (US); Robert E. De Mers, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 319 days.

(21) Appl. No.: 12/210,397

(22) Filed: Sep. 15, 2008

(65) Prior Publication Data

US 2010/0066566 A1    Mar. 18, 2010

(51) Int. Cl.
*G08B 23/00* (2006.01)
(52) U.S. Cl. .............................. 340/979; 340/976; 701/3
(58) Field of Classification Search .................. 340/971, 340/972, 973, 974, 975, 976, 977, 979, 980, 340/983; 701/3, 4, 208; 342/26 R
See application file for complete search history.

(56) References Cited

U.S. PATENT DOCUMENTS

| | | | |
|---|---|---|---|
| 6,289,277 B1 | 9/2001 | Feyereisen et al. | |
| 7,098,809 B2 * | 8/2006 | Feyereisen et al. | 340/963 |
| 7,162,335 B2 * | 1/2007 | He et al. | 701/3 |
| 7,215,256 B2 * | 5/2007 | Reusser et al. | 340/975 |
| 7,411,519 B1 * | 8/2008 | Kuntman et al. | 340/968 |
| 2008/0154493 A1 * | 6/2008 | Bitar et al. | 701/208 |
| 2010/0036548 A1 * | 2/2010 | Nichols et al. | 701/4 |

* cited by examiner

*Primary Examiner* — Van T. Trieu
(74) *Attorney, Agent, or Firm* — Ingrassia Fisher & Lorenz, P.C.

(57) ABSTRACT

An aircraft display system (100) includes a first device (102) providing (402) flight data of a selected flight path of an aircraft (214), a device (106, 114) providing (404) a plurality of data points representative of the terrain (302) below the selected flight path, a processor (104) generating (406) display commands from the flight data and the plurality of data points, and a display (116) coupled to receive the display commands and operable to render (408) in a perspective view an icon representative of the aircraft (214) and the terrain (302) near the aircraft (214).

19 Claims, 4 Drawing Sheets

APPARATUS AND METHOD OF DISPLAYING AN AIRCRAFT'S POSITION

FIELD

The present invention generally relates to an apparatus and a method of presenting the current position of an aircraft on an electronic display and more particularly to a method for presenting a vertical representation of the aircraft in relation to its surrounding environment.

BACKGROUND

Modern map displays, particularly those used in aircraft for flight planning and monitoring, are capable of displaying a considerable amount of information such as terrain information and flight planning information. The terrain information may include situational awareness terrain and cautions that identify potential hazards. Flight planning information may include, for example, flight path and altitude information useful to the pilot.

These electronic instrumentation displays continue to advance in sophistication, achieving increasingly higher levels of information density and, consequently, presenting a greater amount of visual information to be perceived and understood by the operator, e.g., pilot. It is important that visual displays provide a proper cognitive mapping between what the operator is trying to achieve and the information available to accomplish the task.

Data generated vertical profile displays do not provide any indication of the physical dimensions of the geographical area being presented. Known vertical profiles are shown as a "flat" two-dimensional image. However, the data available is not two-dimensional in nature and may be gathered as a corridor of unspecified width projected along the flight path, or as a forward-looking cone. It would be beneficial to pilots if more of the available information could be presented.

Accordingly, it is desirable to provide an apparatus and method for illustrating the terrain near the flight path on a vertical display in a more intuitive manner. Furthermore, other desirable features and characteristics of the present invention will become apparent from the subsequent detailed description and the appended claims, taken in conjunction with the accompanying drawings and this background.

BRIEF SUMMARY OF THE INVENTION

An aircraft display system includes a first device providing flight data of a selected flight path of an aircraft, a device providing a plurality of data points representative of the terrain below the selected flight path, a processor generating display commands from the flight data and the plurality of data points, and a display coupled to receive the display commands and operable to render in a perspective view an icon representative of the aircraft and the terrain near the aircraft.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The mapping methods described herein may be used with a variety of aircraft, such as planes and helicopters. The aviation environment is described herein as the exemplary embodiment and may include navigation from point to point or approach and landing at an airport. Generally a top view display is presented in conjunction with the vertical view presented herein. Various types of maps may be used for display on the top view, for example, road maps, terrain maps, aviation maps, and topographical maps.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, political boundaries, etc).

Three dimensional perspective representations of terrain and flight planning information provide better spatial understanding and situation awareness and therefore reduce the navigational workload for a flight crew. A flight path display with a terrain underlay will also significantly enhance the perception of depth and relative location during the flight path visualization therefore reducing flight crew work load and improving the vertical awareness relative to terrain.

A perspective vertical view in accordance with the exemplary embodiment provides additional information regarding how the vertical profile data is gathered and analyzed. This three-dimensional data presentation will give the pilots the ability to better understand the vertical profile without a data overload of a full three-dimensional navigation display.

The perspective display provides a pilot (or other observer) with important navigational information. The perspective display provides information regarding the aircraft's orientation (e.g., the aircraft's attitude, altitude, pitch, roll, etc.) and aspects of nearby geographical features in an intuitive manner. Thus, a pilot may refer to the perspective vertical display when navigating around a geographical feature, such as a mountain.

Alternate embodiments of the present invention to those described below may utilize whatever navigation system signals are available, for example a ground based navigational system, a GPS navigation aid, a flight management system, and an inertial navigation system, to dynamically calibrate and determine a precise course.

Figure 1:
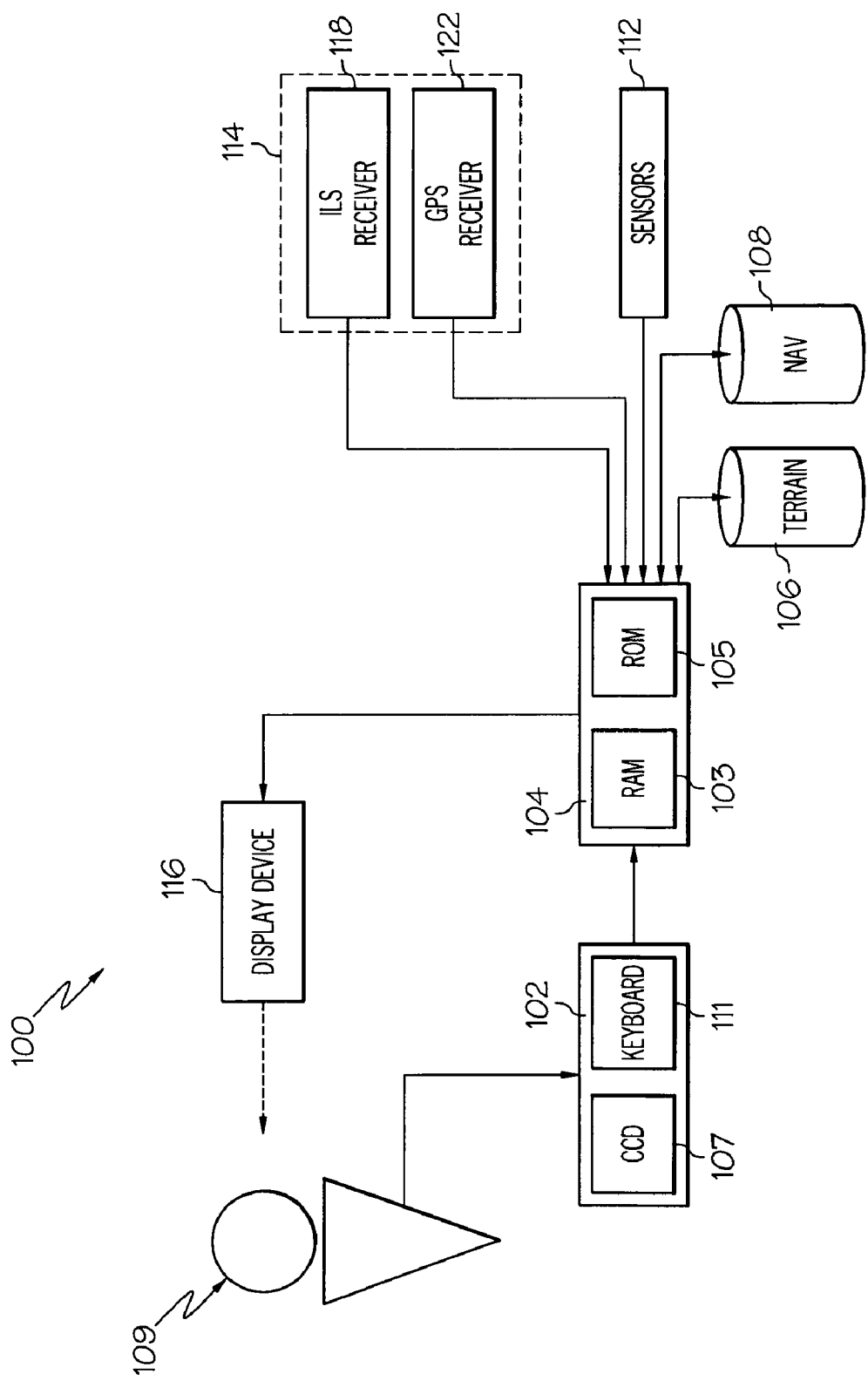
FIG. 1 is a functional block diagram of a known flight display system.

Referring to FIG. 1, a known exemplary flight deck display system is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108 (including surface features such as roads), and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a navigation display.

The display device 116 is used to display various images and data, in both a graphical and a textual format, and to supply visual feedback to the user 109 in response to the user input commands supplied by the user 109 to the user interface 102. It will be appreciated that the display device 116 may be implemented using any one of numerous known display devices suitable for rendering image and/or text data in a format viewable by the user 109. Non-limiting examples of such display devices include various cathode ray tube (CRT) displays, and various flat panel displays such as, various types of LCD (liquid crystal display) and TFT (thin film transistor) displays. The display device 116 may additionally be implemented as a panel mounted display, a HUD (head-up display) projection, or any one of numerous known technologies.

Figure 2:
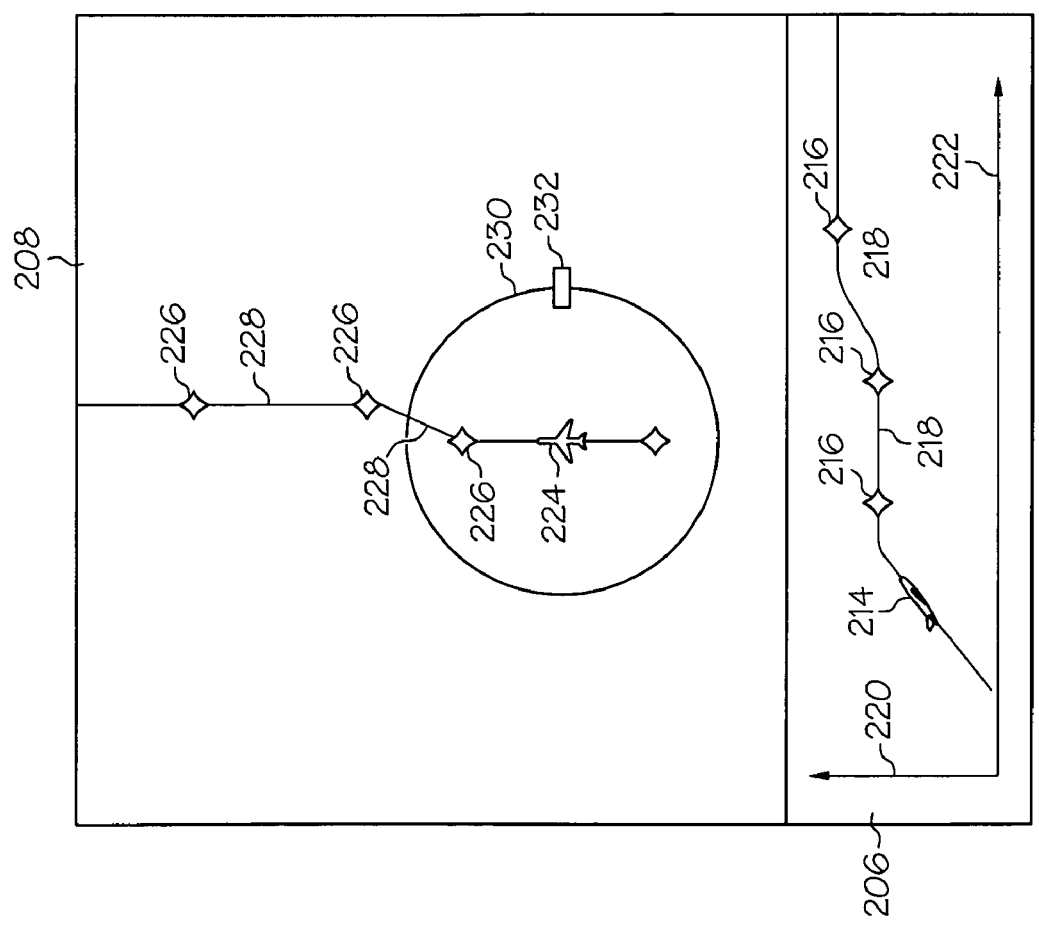
FIG. 2 is a known representation of a display that may be rendered on the flight display system of FIG. 1.

With reference to FIG. 2, it seen that a known display 108 includes a display area 200 in which multiple graphical and textual images may be simultaneously displayed. For example, a vertical profile 206, and a lateral map 208 may be displayed simultaneously, alone, or in various combinations. General flight-related data may be displayed including various types of data related to the flight plan of the aircraft. Such data includes, but is not limited to, the flight identifier, route iteration number, a waypoint list and associated information, such as bearing and time to arrive, just to name a few. It will be appreciated that the general flight-related data may additionally include various types of data associated with various types of flight hazards. Examples of these, and other types of data that may be displayed, are disclosed in U.S. Pat. No.

6,289,277, entitled "Interfaces for Planning Vehicle Routes," which is assigned to the assignee of the present application, and the entirety of which is hereby incorporated by reference.

The lateral map 208 includes a top-view aircraft symbol 224, one or more waypoint symbols 226A-D, line segments 228A-D that interconnect the waypoint symbols 226, and one or more range rings 230. The lateral map 208 also preferably includes various map features including, but not limited to, terrain, political boundaries, and navigation aids, which, for clarity, are not shown in FIG. 2. The range rings 230, only one of which is shown in FIG. 2, indicate nautical distance from the top-view aircraft symbol 224. In the illustrated embodiment, the range ring 230 includes a range indicator 232, which displays the lateral distance from the aircraft's present position to the position on the lateral map 202 that corresponds to the range ring 230 (e.g., 200 nautical miles). It will be appreciated that the value of the range indicator 232 may be set manually or automatically, via a non-illustrated a pop-up menu.

The vertical profile 206 includes a side-view aircraft symbol 214, one or more waypoint symbols 216A-D, line segments 218A-D that interconnects the waypoint symbols 216, a vertical axis 220, and a horizontal axis 222. The waypoint symbols 216 and interconnecting line segments 218 correspond to the current flight path and flight plan of the aircraft. The vertical axis 220 represents aircraft altitude and is suitably graduated with altitude values (not shown), and the horizontal axis 222 represents aircraft lateral position and is suitably graduated with lateral distance values (not shown). It will be appreciated that the horizontal axis 222 could alternatively be graduated with time values in addition to, or instead of, lateral distance values.

Figure 3:
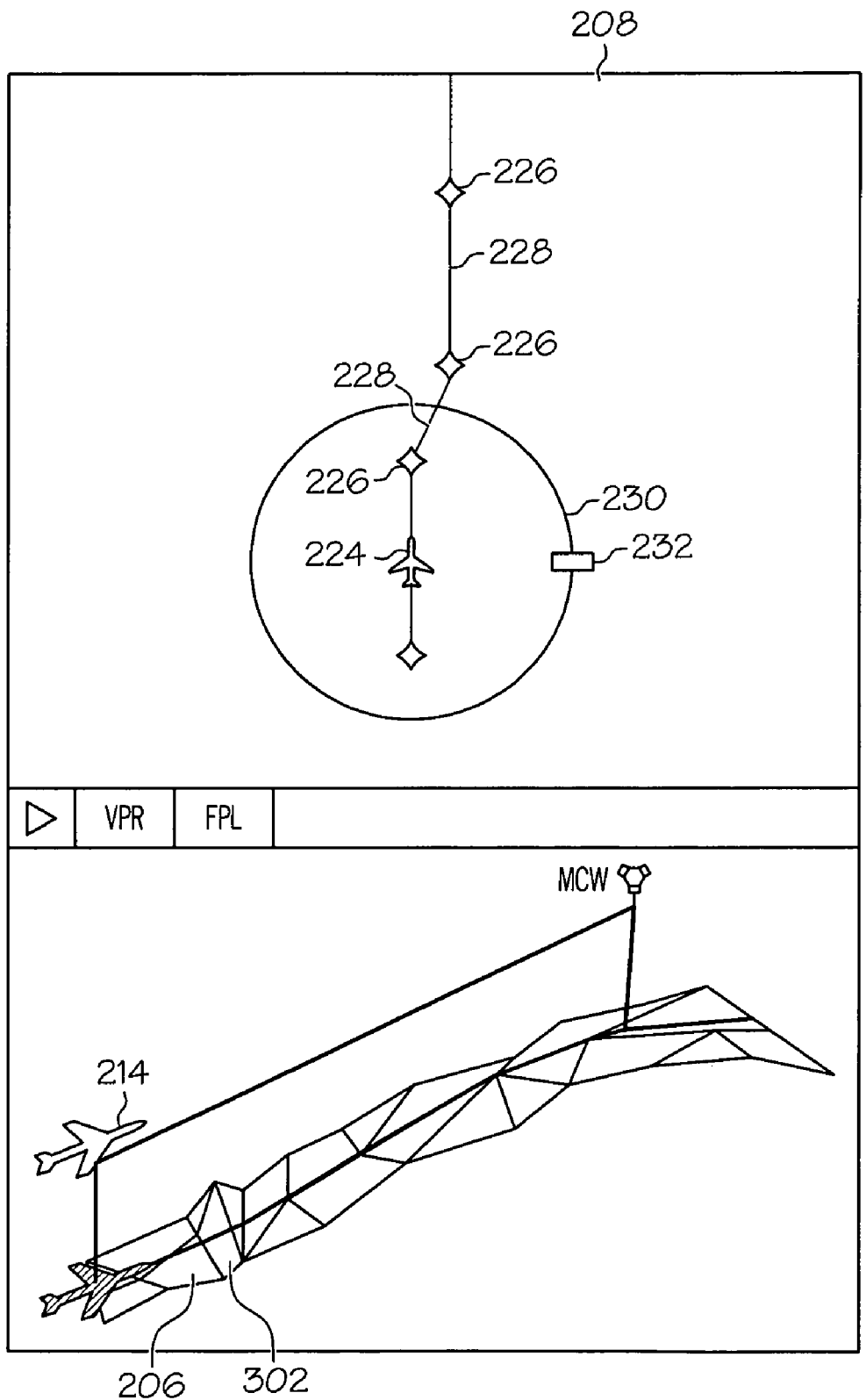
FIG. 3 is an exemplary image of a display including a vertical map that may be rendered in accordance with an exemplary embodiment on the flight display system of FIG. 1.

Referring to FIG. 3 and in accordance with the exemplary embodiment, a vertical profile 206 and a lateral map 208 are illustrated on a display 300 in which elements similar to those of FIG. 2 bear the same reference numeral. However, instead of simply displaying a horizontal axis 222 on the vertical profile 206, a representative image 302 of the terrain is shown. The terrain is illustrated as a series of planes in a perspective view providing the pilot a symbolic view of the terrain beneath, around, and ahead of the aircraft 214. Information determining the image of the terrain may be obtained from the terrain database 106, the external data source 114, for example, a terrain avoidance and warning system (TAWS), or other methods. The representative image 302 is generated from a plurality of datapoints provided from, for example, the Defense Mapping Agency.

The representative image 302 of the terrain on the vertical profile 206 is also designed to show the pilot the resolution of the terrain data that is used to generate the representative image 302. The pilot will, in all likelihood, fly directly over some of the terrain datapoints or at least close to some of them. Hence, the swath of terrain may show the aircraft's path crossing vertices as well as planes.

If the aircraft path crosses a vertex, then the pilot knows that the terrain height below is a true, measured point. If the path is crossing a plane between vertices, the terrain height shown is interpolated from the adjacent measured data points.

The primary purpose of the representative image 302 shown in FIG. 3 is to provide the pilot with this information on the "trueness" of the profile, whether it is measured or calculated. This could be important in areas where there are extreme altitude changes over a short horizontal distance, for example, a cliff side. If the terrain mapping agency measures altitudes every 100 meters, one point may be on the top of the cliff at 200 meters, and the next in the valley, at zero meters. If the pilot is flying over a point halfway between the two, the software takes an average of the two readings, giving an altitude of the terrain below the aircraft of 100 meters. In actuality, the altitude could be, for example, zero meters, 30 meters, 100 meters, or 250 meters.

The traditional vertical profile can only show a single line, with a mix of measured points and interpolated points. The perspective view will show the pilot that the terrain adjacent to the flight path is undergoing a drastic change in altitude and that the representation should be used with an understanding of such.

Figure 4:
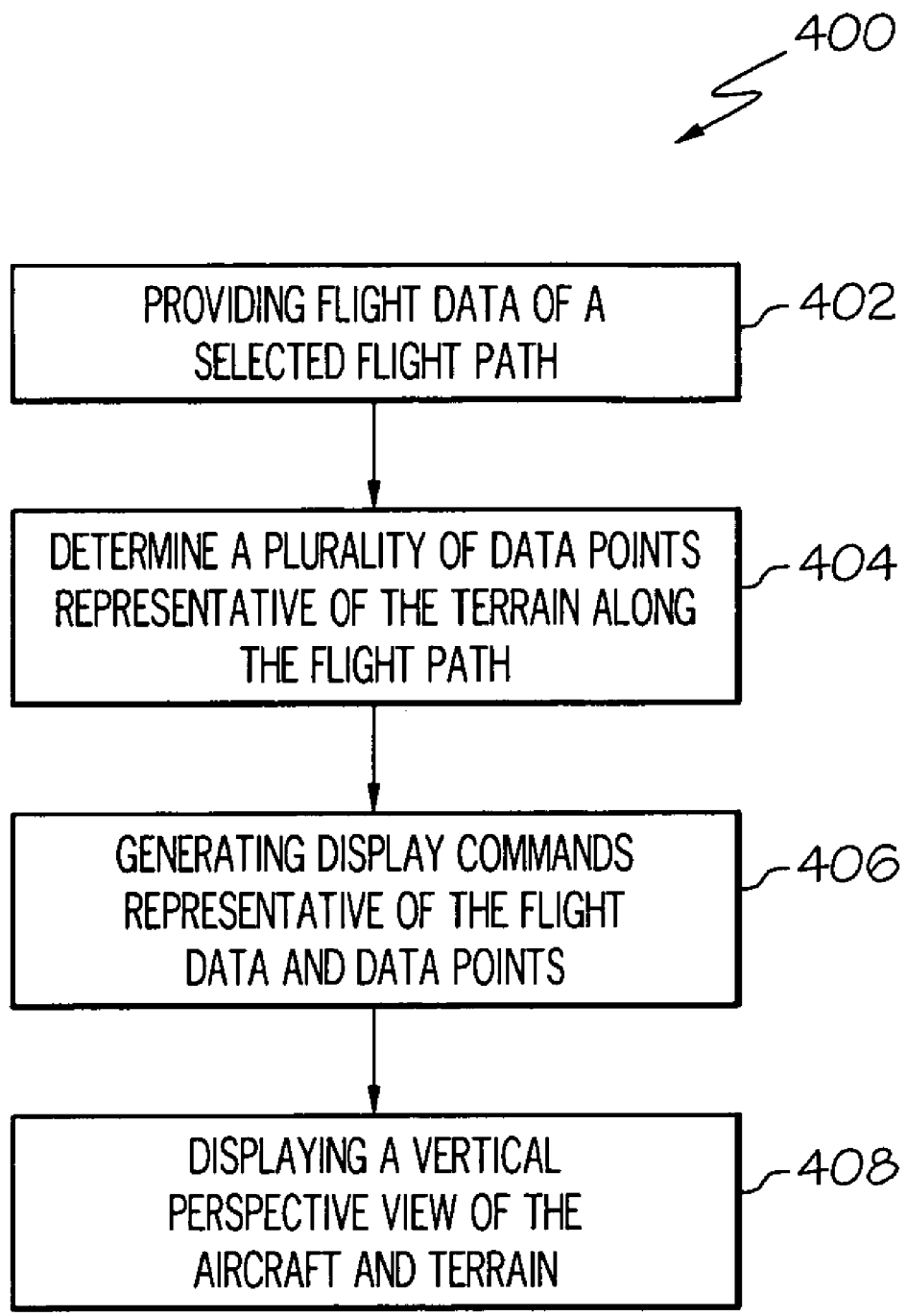
FIG. 4 is a flow chart of the method in accordance with the exemplary embodiment.

In accordance with the exemplary embodiment and referring to the flow chart of FIG. 4, a flight path is selected 402. A number of data points representative of the terrain are determined 404 from information supplied from the terrain database 106 or the external data source 114. A processor 104 constructs 406 display commands from the flight path and data points, and provides them to the display 116 for displaying 408 a perspective vertical representation of an aircraft icon 214 in relation to a representation of the terrain.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An aircraft display system comprising:
a first device providing flight planning information of a selected flight path of an aircraft;
a second device providing a plurality of first data points representative of the terrain height beneath, around, and ahead of the selected flight path;
a processor configured to:
  interpolate terrain heights between the first data points; and
  generate first display commands from the flight planning information, the plurality of first data points, and the interpolated terrain heights; and
a display coupled to receive the first display commands and operable to render a three dimensional symbolic perspective view of the first data points and the interpolated terrain heights beneath, around, and ahead of the aircraft, and an icon representative of the aircraft and its orientation.

2. The aircraft display system of claim 1 wherein the device further provides a plurality of second data points representative of a plurality of obstacles below the selected flight path, the processor generates second display commands from the plurality of second data points, and the display is coupled to receive the second display commands and operable to render in the three dimensional symbolic perspective view the obstacles near the aircraft.

3. The aircraft display system of claim 1 wherein the three dimensional symbolic perspective view of the icon representative of the aircraft enhances perception of relative location to the terrain.

4. The aircraft display system of claim 1 wherein the aircraft orientation includes attitude, altitude, pitch, and roll.

5. The aircraft display system of claim 1 wherein the display commands include aircraft waypoints which are displayed on the display.

6. The aircraft display system of claim 1 wherein the three dimensional symbolic perspective view of the terrain comprises a series of planes interconnected between the first datapoints.

7. The aircraft display system of claim 1 wherein the three dimensional symbolic perspective view of the terrain is selected from at least one of the group consisting of a hill, a depression, and a lake.

8. The aircraft display system of claim 1 wherein the three dimensional symbolic perspective view of the terrain comprises an indication of the aircraft icon's position above the terrain.

9. An aircraft display system for an aircraft, comprising:
a memory for storing a plurality of data points relating to elevation of a terrain;
a processor adapted to receive data representative of a planned ground tract, and the plurality of data points representative of the terrain beneath, around, and ahead of the aircraft, and configured upon receipt of these data to interpolate terrain heights between the data points and to supply a plurality of ground tract rendering display commands; and
a display device coupled to receive the plurality of ground tract image rendering display commands and operable to render in a three dimensional symbolic perspective view on a vertical display an icon representative of the desired aircraft and it orientation, and an image representative of the terrain beneath, around, and ahead of the aircraft.

10. The aircraft display system of claim 9 wherein the device further provides a plurality of second data points representative of a plurality of obstacles below the selected flight path, the processor generates second display commands from the plurality of second data points, and the display is coupled to receive the second display commands and operable to render in the three dimensional symbolic perspective view on the vertical display the obstacles near the aircraft.

11. The aircraft display system of claim 9 wherein the three dimensional symbolic perspective view of the icon representative of the aircraft enhances perception of relative location to the terrain.

12. The aircraft display system of claim 9 wherein the three dimensional symbolic perspective view of the icon representative of the aircraft provides aircraft orientation with respect to the terrain.

13. The aircraft display system of claim 12 wherein the aircraft orientation includes attitude, altitude, pitch, and roll.

14. The aircraft display system of claim 9 wherein the display commands include aircraft waypoints which are displayed on the display.

15. The aircraft display system of claim 9 wherein the three dimensional symbolic perspective view of the terrain comprises a series of planes interconnected between the data points.

16. The aircraft display system of claim 9 wherein the three dimensional symbolic perspective view of the terrain is selected from at least one of the group consisting of a hill, a depression, and a lake.

17. The aircraft display system of claim 9 wherein the three dimensional symbolic perspective view of the terrain comprises an indication of the aircraft icon's position above the terrain.

18. A method of displaying a vertical representation of an aircraft in relation to terrain, comprising:
selecting a desired ground track;
determining a plurality of data points representative of the terrain beneath, around, and ahead of the aircraft;
interpolating terrain heights between the data points; and
displaying a three dimensional symbolic perspective vertical representation of an aircraft icon and its orientation in relation to a representation of the terrain including the data points and the interpolated terrain heights.

19. The method of claim 18 wherein the selecting step comprises illustrating a selected one of the group consisting of a road map, a terrain map, an aviation map, and a topographical map.

* * * * *